(12) United States Patent
Abegglen et al.

(10) Patent No.: US 8,176,714 B2
(45) Date of Patent: May 15, 2012

(54) CAPSULE FOR PREPARING A BEVERAGE WITH A SEALING MEMBER FOR WATER TIGHTNESS ATTACHED THERETO AND METHOD OF PRODUCING THE SAME

(75) Inventors: Daniel Abegglen, Rances (CH); Thomas Kaeser, Brent VD (CH); Alexandre Kollep, Lutry (CH); Roland Huber, Hendschiken (CH)

(73) Assignee: Nestec S.A., Vevey (CH)

( * ) Notice: Subject to any disclaimer, the term of this patent is extended or adjusted under 35 U.S.C. 154(b) by 629 days.

(21) Appl. No.: 12/298,128

(22) PCT Filed: Apr. 23, 2007

(86) PCT No.: PCT/EP2007/053926
§ 371 (c)(1),
(2), (4) Date: Jun. 15, 2009

(87) PCT Pub. No.: WO2007/122208
PCT Pub. Date: Nov. 1, 2007

(65) Prior Publication Data
US 2010/0015307 A1 Jan. 21, 2010

(30) Foreign Application Priority Data
Apr. 24, 2006 (EP) .................. 06112974

(51) Int. Cl.
*B65B 25/00* (2006.01)
(52) U.S. Cl. ............... 53/452; 99/279; 156/91; 264/571
(58) Field of Classification Search .................. 53/129.1, 53/452
See application file for complete search history.

(56) References Cited

U.S. PATENT DOCUMENTS

| | | | |
|---|---|---|---|
| 4,351,629 A | 9/1982 | Farrell | 425/116 |
| 6,026,732 A * | 2/2000 | Kollep et al. | 99/295 |
| 6,854,378 B2 * | 2/2005 | Jarisch et al. | 99/295 |
| 7,946,217 B2 * | 5/2011 | Favre et al. | 99/295 |
| 7,993,691 B2 * | 8/2011 | Yoakim et al. | 426/77 |
| 2001/0052294 A1* | 12/2001 | Schmed | 99/295 |
| 2003/0217643 A1* | 11/2003 | Masek et al. | 99/279 |
| 2004/0262322 A1 | 12/2004 | Middleton et al. | 220/675 |

FOREIGN PATENT DOCUMENTS

| | | |
|---|---|---|
| DE | 10 204 505 | 9/2003 |
| EP | 0 512 470 | 11/1992 |
| EP | 1 247 756 | 10/2002 |
| EP | 1 654 966 A1 | 5/2006 |
| FR | 2 617 389 | 1/1989 |

OTHER PUBLICATIONS

International Search Report PCT/EP2007/053926 Dated Jul. 25, 2007 and Written Opinion.

* cited by examiner

*Primary Examiner* — Hemant M Desai
(74) *Attorney, Agent, or Firm* — Winston & Strawn LLP

(57) ABSTRACT

Method for producing a capsule containing beverage ingredients designed for insertion in a beverage production device in which a liquid under pressure enters the capsule in order to interact with the ingredients in the capsule and to drain a beverage from the capsule, wherein the capsule includes a body with a sealing member attached thereto. The method includes providing the body with a main cavity, injecting at least one sealing material by injection-molding onto at least a portion of the external surface of the body to mold a sealing member sealingly attached to the body, filling the cavity with food ingredients and imperviously closing the cavity with a membrane to provide a closed capsule containing the food ingredients.

21 Claims, 12 Drawing Sheets

CAPSULE FOR PREPARING A BEVERAGE WITH A SEALING MEMBER FOR WATER TIGHTNESS ATTACHED THERETO AND METHOD OF PRODUCING THE SAME

This application is a 371 filing of International Patent Application PCT/EP2007/053926 filed Apr. 23, 2007, which claims priority to a European application No. 06112974.8, filed on Apr. 24, 2006.

BACKGROUND

The present invention generally relates to capsules for containing beverage ingredients to a beverage producing system for use in connection with such capsules as well as to a method for producing such capsules.

The background of the present invention is the field of capsules which contain beverage ingredients (e.g., coffee ground, milk powder) or other comestible ingredients (e.g. dehydrated soup). By means of an interaction of these ingredients with a liquid, a beverage or other comestibles can be produced. The interaction can be for example an extraction, brewing or dissolution process. Such a capsule is particularly adapted to contain ground coffee in order to produce a coffee beverage by having hot water under pressure enter the capsule and draining a coffee beverage from the capsule.

Systems and methods for obtaining fluid comestibles from substances containing capsules are for example known from EP-A-512470.

The general principle of this extraction process can be summarized as follows:

An initially closed capsule is inserted between capsule holder means which are closed in a water tight manner about the capsule;

Water injection means of the machine inject water in the capsule;

Water interacts with the ingredients contained in the capsule while traversing the interior of the capsule and is then made to leave the capsule through at least one opening/perforation created in the second wall.

The ingredients in the capsule constitute the "bottleneck" of the flow path of the water and will therefore cause a pressure drop between the upstream and the downstream side of the liquid flow through the capsule, which pressure drop will even increase during the interaction between the liquid and the ingredients for example due to a swelling of the ingredients. Correspondingly it has to be assured that the only water flow is actually taking place through the interior of the capsule and that no water can flow from the water injector into the interstice between the annular enclosing member and the exterior of the capsule and then to the draining bore of the device. In other words, any water flow exterior to the capsule has to be stopped by a sealing engagement between an annular enclosing member of the holder means and the capsule and in the flow path between the water injector and the beverage-draining bore.

Such sealing engagement can be achieved at least to a certain degree by the pinching engagement between the capsule holder means (i.e., annular enclosing member and capsule holder) and the flange-like rim of the body in-between.

In case the sealing engagement is not working properly and water is flowing outside the capsule, no pressure sufficient to cause the tearing of the tear face will be built up inside the capsule or, alternatively, the pressure will be causing no complete tearing of the tear face and therefore a poor extraction of the substance. In such a scenario water will be drained from the beverage production device without having interacted or fully interacted under sufficient pressure conditions, with the ingredients contained in the capsule.

An improvement could be thought of according to which this sealing engagement is further improved by lining the inner wall of the annular member with a rubber-elastic material. In other words, according to said approach the sealing engagement is assured by structures fixed to or attached with the beverage-producing device. This has disadvantages in that after the use of a substantial number of capsules a wearing off of the fixed sealing means can take place such that the quality of the produced beverage is increasingly deteriorated by water passing the no longer properly efficient sealing. Furthermore, the sealing means can become dirty with organic residues sticking to it which is not very hygienic and may affect the sealing and pressure conditions as well during extraction.

Any "leak" at the exterior of the capsule reduces the pressure build-up inside the capsule. On the other hand, it is well known that a sufficient extraction pressure is a key factor for the quality of espresso-style coffee. European co-pending patent application No. 04025320.5 entitled "Capsule with sealing means" aims at an improvement of the sealing engagement positioned between the liquid inlet and the beverage draining side of such a beverage production system. The invention aims at transferring a resilient part of the sealing engagement from the beverage production device to the capsule. The advantage is that any resilient sealing member is only used once (i.e. only with the associated capsule) such that a proper functioning of the sealing can be assured and no hygienic problems can occur at the sealing member.

SUMMARY OF THE INVENTION

The present invention aims at another improvement of European co-pending patent application No. 04025320.5 in order to improve the sealing conditions between the capsule and the seal so to ensure water tightness during brewing. Indeed, it is of importance to avoid any potential liquid leakage between the sealing member and the rest of the capsule in particular thanks to a good bond created between the two.

Furthermore, it is also of importance that the sealing member is integrated to the capsule using a process that can be implemented on a large industrial scale, be highly reliable with minimal defective products and be also cost effective.

The object is achieved by means of the features of the independent claims. The depending claims further develop the central idea of the present invention.

For this, the method of the invention is for providing a sealing member on the body of a capsule containing beverage ingredients designed for insertion in a beverage production device in which a liquid under pressure enters the capsule in order to interact with the ingredients in the capsule and to drain a beverage from the capsule, characterized in that it comprises providing a body and injecting at least one sealing material by injection-moulding onto at least a portion of the external surface of the body to mould a sealing member sealingly attached to the body.

More particularly, the injection of a sealing material (or sealant) to form the sealing member offers many advantages. First of all, the adhesion of the sealing member can be very much improved compared to attaching a prefabricated sealing member. As a result, liquid leakage can be prevented between the sealing member and the capsule's body and the conditions of extractions can be better guaranteed and maintained from capsule to capsule (better brewing conditions repeatability). The sealing member being more solidly attached as a part of the capsule, there is less risk for the sealing member to detach or be removed for use in beverage brewing machines which are not intended for receiving capsules without the sealing member and consequently also to reduce the risk of malfunctioning.

Furthermore, this offers more opportunities for producing the capsule's body with simpler or more varied shapes. The method is also quicker, more cost effective than adding and attaching a sealing member by mechanical, welding and/or adhesive means and can be implemented in effective manner, at high throughput and large industrial scale.

Preferably, the sealing material is made of a different material from the material of the body. More preferably, the sealing material is softer than the material of the body.

In a preferred mode, the body is formed with a flange-like rim and the injection step comprises injecting the sealing member onto the flange-like rim. The flange-like rim represents the region at which the capsule is pinched by the enclosing members (e.g., a bell member and a capsule holder hermetically closing about the capsule) of the beverage production device. The injected sealing member being of softer material than the body at the flange-like rim, it can be compressed to compensate for the irregularities, tolerance plays or gaps and so on, to maintain water tightness under the brewing pressure in the enclosure for the capsule.

The flange-like rim can further comprise an anchoring portion and a support portion. The anchoring portion is arranged so that, during injection, the material of the sealing member can flow in the anchoring portion to improve the connection between the sealing member and the body.

The anchoring portion can be formed of a partially curled portion. The curled portion can comprise an opening, e.g., an annular opening, for plastic to flow therein during injection. The curled portion can be formed during a deep drawing operation of the body that precedes the injection of the sealing member or alternatively is formed in a separate forming operation of the flange-like rim after deep drawing the cavity of the capsule's body. The operation for injecting the sealing member is preferably a high-pressure plastic injection. The capsule body is clamped both internally, i.e., on the cavity side, and externally, i.e., on the external side of the sidewall of the body, by injection dies and an injecting enclosure is defined by the dies for delimiting the volume to be filled in for the sealing material. The sealing material can be injected at a pressure that exceeds 500 bar, preferably between 500 and 2000 bar, more preferably between 800 and 1500 bar. The injection time is very quick and does typically not exceed more than a second. Just after injection, the sealing material is allowed to cool down for solidifying during a few seconds, in general, between 3 to 8 seconds.

The material for the seal member should be chosen amongst thermoplastic elastomer having ability to be resilient, heat and pressure resistant and injectable. Preferably, the thermoplastic material is typically a Thermoplastic Elastomer ("TPE"). More preferably, the TPE is a polypropylene based elastomer.

As mentioned, in a preliminary production step, the capsule body can be preformed by deep drawing of a metal or metal-plastic sheet. The capsule body can be deep drawn during one step or during sequential steps to form a final main open cavity enabling filling of the food ingredients. The flange-like rim, anchoring means in particular the curled end of the rim or other important functional shapes may be formed during the deep drawing operation(s).

Furthermore, at least one localized deformation of the body sidewall can be carried out to create further anchoring means for the sealing member, in particular, at a collar portion of the sealing member that extends along the sidewall body. The localized deformation(s) can be formed in the sidewall of the body so to create, for instance, one or more arc-shaped protrusions of body's wall rising inside the material of the sealing member. Said localized deformation(s) can be carried out during injection or cooling down of the injected sealing member. In another subsequent step, the body is filled with the food ingredient such as roast and ground coffee.

The capsule body can comprise aluminium. It can be a single ply of aluminium or a multi-ply of plastic and aluminium such as polypropylene and aluminium.

The invention also relates to producing a capsule containing beverage ingredients designed for insertion in a beverage production device, i.e., between capsule enclosing members, in which a liquid under pressure enters the capsule in order to interact with the ingredients in the capsule and to drain a beverage from the capsule. The capsule comprises a body with a sealing member attached thereto. The sealing member is intended to provide water tightness between the capsule and at least a pressing surface of the production device, i.e., of one of the enclosing members of the device. The method comprises providing a body, filling the body with food ingredients and imperviously closing the body. The method also comprises injecting at least one sealing material by injection-moulding onto at least a portion of the external surface of the body to form a sealing member sealingly attached to the body.

In a subsequent step following the food ingredient filling step, a membrane is welded along a portion of the external face of the flange-like rim to close the capsule. The seal membrane can also be aluminium or a laminate of plastic and aluminium.

The invention also relates to a particular injection layout for injecting sealing material onto the surface of capsule bodies produced according to the method of the invention.

The layout comprises:
- a first injection die member comprising at least a first and second injection sides for receiving a plurality of capsule bodies,
- at least a second injection die member configured for closing against the first injection die member and for engaging the pluralities of capsule bodies;
- at least first body's replacing means configured for replacing capsule bodies in one of the first or second injection sides while injection-moulding of sealing material is carried out on the capsule bodies of the at least one other injection side of the first die member, wherein the first and at least second injection die members are mobile relative one another to enable the closing of the second die member against alternatively the first and second sides of the first injection die member.

Therefore, injection-moulding of the capsule bodies can be achieved at a high throughput and in an automated manner according to this particular layout.

More particularly, the first and second sides of the first die member comprises series of cavities for receiving the capsule bodies whereas the second die member comprises a series of mandrels for engaging the capsule bodies in closure of the die members.

The other depending claims develop further this particular layout for carrying out the method of the invention.

BRIEF DESCRIPTION OF THE DRAWINGS

Further advantages, features and objects of the present invention will become apparent for the man skilled in the art when reading the following detailed description of embodiments of the present invention taking in conjunction with the figures of the enclosed drawings.

FIG. 6 shows the male die without the capsule body being positioned thereon, FIG. 7 shows the male die with the capsule body being positioned after injection of the sealing member, FIG. 8 shows the male die with the capsule body being positioned but with the sealing member being removed for showing the localized deformations being formed on the body by the die, FIG. 9 shows a cross sectional view of the male die without capsule body, FIG. 10 shows a detail cross sectional view of the male die with the capsule body being positioned and the sealing member being injected.

DETAILED DESCRIPTION OF THE PREFERRED EMBODIMENTS

Figure 1:
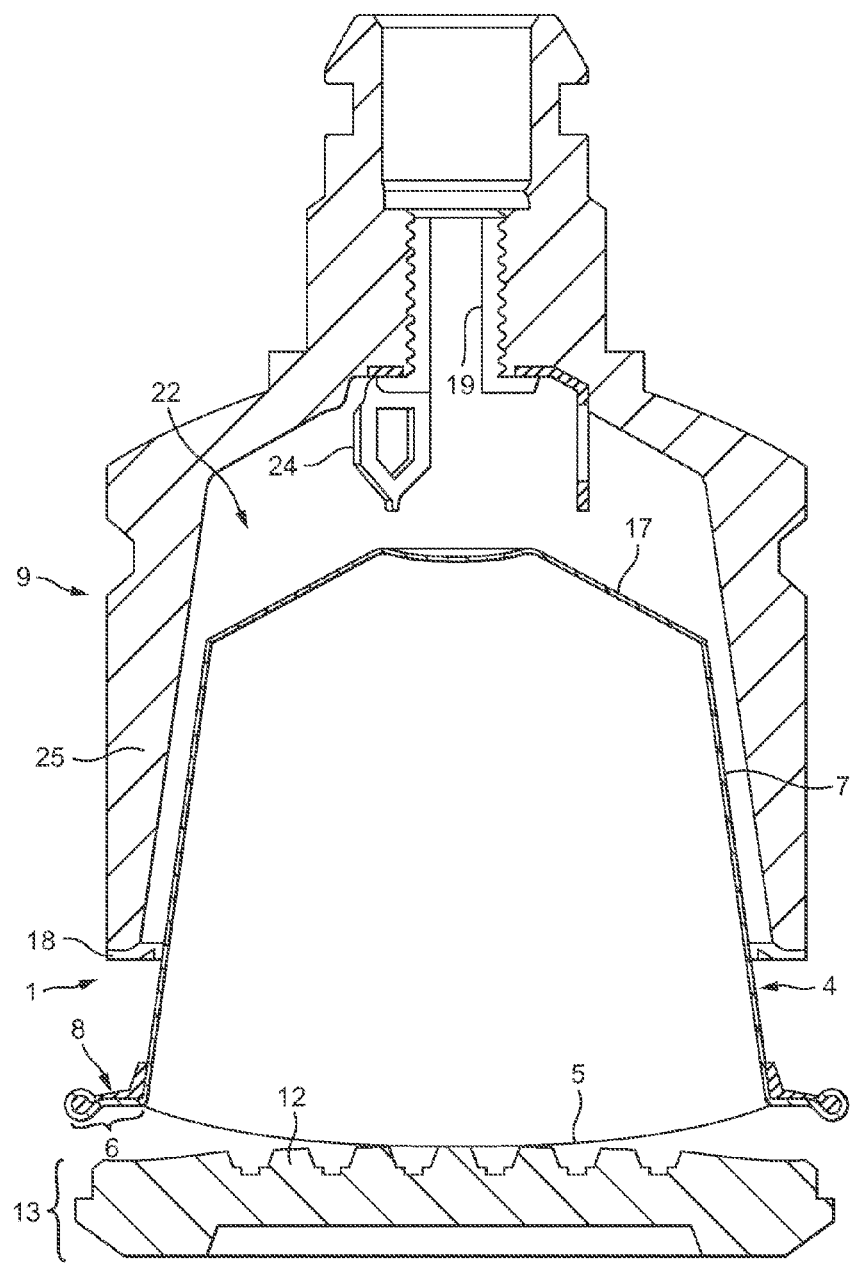
FIG. 1 shows a first embodiment of the capsule system of the present invention in which a capsule is placed on the capsule holder but has not yet reached its closing position in the beverage production device.

Note that in the following the invention will be explained referring to a certain design of a capsule, i.e. a design according to which the capsule comprises a cup-like base body and a closing foil member. However, it is to be understood than other designs of the capsule are viable, such as e.g. capsules having a lenticular form with two essentially matching and opposing walls (e.g. foils) being sealed at the e.g. ring-shaped edge. Generally a capsule according to the present invention comprises at least two opposing wall members (faces) which are connected to each other at their respective edges to form a sealed flange-like rim area, thus enclosing a sealed interior.

The embodiment shows a capsule holder 13 having relief elements 12 which are designed to tear and perforate a foil member 5 closing off a cup-like base body 4 of the capsule 1. This tearing of the foil member 5 can occur as soon as the pressure inside the capsule exceeds a threshold value. Note that the relief elements can have any protruding shape able to cause a controlled tearing of the foil member. As an example only pyramids, needles, bumps, cylinders, elongated ribs are cited. The relief element can also be single.

FIG. 1 shows a state in which such a capsule has been placed on a capsule holder 13, the foil member 5 resting on the relief elements 12 of the capsule holder 13 and the cup-like base body 4 of the capsule 1 being already partly surrounded by the circumferential wall 25 of an enclosing member 9 of the beverage production device. The shown enclosing member can have the shape of a bell. Other shapes are viable, wherein the design of the interior contours (recess) of the enclosing member is generally adapted to substantially match the contours of the capsule 1.

The capsule holder 13 (also representing an enclosing member) and the enclosing member 9 thus can selectively enclose a capsule enclosure space 22 when transferred from an opened position into a capsule-enclosing position.

Note that the foil member 5 as shown is not necessarily exactly flat due to a defined over pressure inside the capsule, which over pressure is generated by introducing e.g. a protective gas when producing the filled capsule and during delayed degassing of the food ingredients after sealing, for instance, carbon dioxide from coffee.

The enclosing (bell) member 9 furthermore comprises an annular pressing surface 18 and a water inlet opening 20 for feeding a liquid such as for example hot water under pressure to a water injection system 14 which is releasable mounted (e.g., screwed) to the bell member 9.

The water injection system can comprise one or more perforation elements (blades, pins, etc.) 24 designed to produce one or more openings in the top wall 17 of the capsule 1 when the capsule holder 13 and the bell member 9 are moved close together e.g. by a manually operated or an automatic closing mechanism. A channel 19 traverses the injection system and leads to the enclosure 22 of the enclosing member 9 such that water can be fed to the interior of the capsule 1 once the perforation elements 24 protrude into the interior of the capsule 1.

The capsule 1 comprises said top wall 17, a side wall 7 and a flange-like rim 6, wherein the foil member 5 is sealed to said flange-like rim 6 to close-off hermetically the cup-like base body 4 of the capsule 1. Again, other designs for the capsule are possible as long as the capsule can be sealed and contain the mentioned ingredients.

According to the present invention the outer surface of the capsule 1 presents a dedicated water tightness sealing member (made of sealing material) 8 thereafter called "sealing member". The sealing member 8 can be compressible, more preferably resilient.

The material for the sealing member can be an injectable thermoplastic elastomer.

Figure 2:
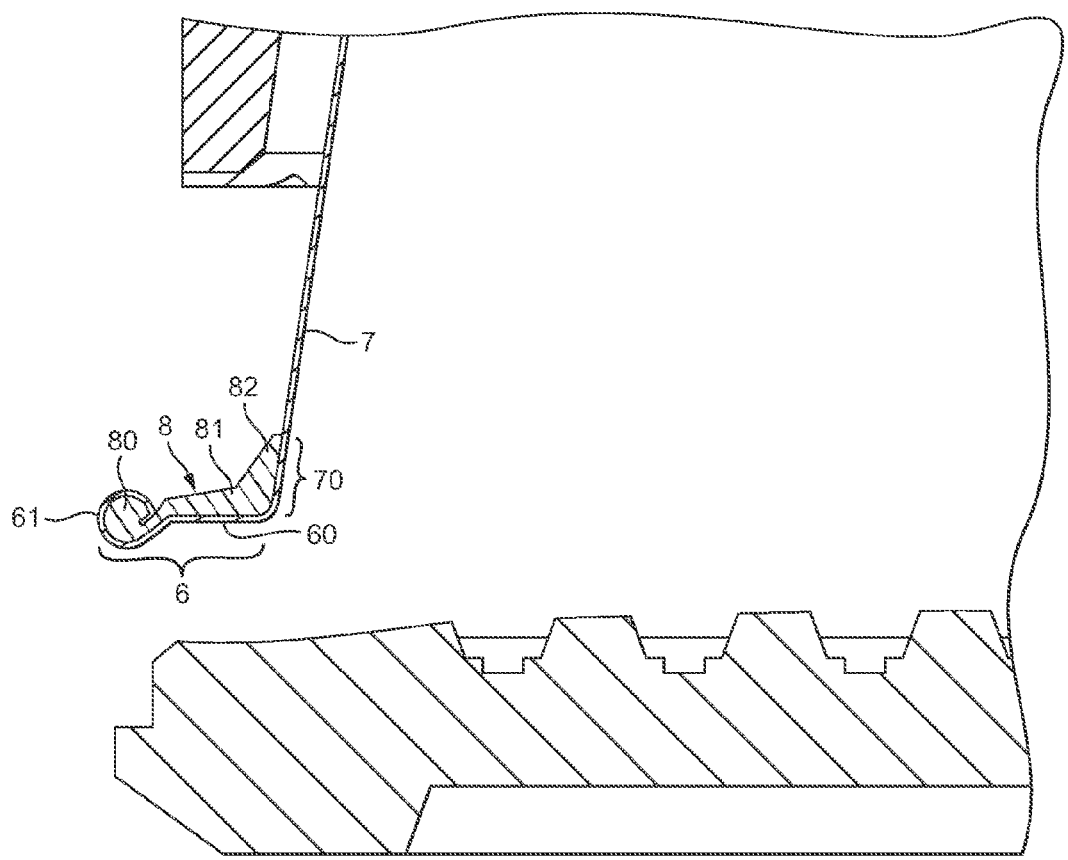
FIG. 2 shows an enlarged of FIG. 1, FIG. 3 the first embodiment in a state, in which a capsule has reached its closing position between the capsule enclosing parts, i.e., a bell member and the capsule holder.

As more apparent in FIG. 2, the capsule of the invention comprises a flange-like rim 6 with a support portion 60 for the sealing member and a partially curled end portion 61 forming an anchoring portion for the sealing member. The support portion 60 merges with the sidewall 7 of the body 4 at a certain angle (i.e., slightly more than 90 degrees when the body has a truncated form). The flange like rim as well as the base surface 70 of the sidewall receives the annular sealing member 8. In order for the sealing member to be affixed to the flange-like rim in a reliable manner, the sealing member extends toward the partially curled portion 61 by a connection portion 80 which is injected in the partially curled portion 61 of the rim. The curled ends forms a "hook" for the sealing material which so increases the connection and also the water tightness between the sealing member and the rim. Outside the partially curled portion 61, the sealing member 8 extends along the support portion 60 of the flange-like rim by a sealing portion 81 that can extend by collar portion 82 applied against the base surface 70 of the body's sidewall 7. The sealing portion 81 and collar portion 82 can form surfaces of different slopes or can merge in a single continuous concave or flat inclined surface. The form of the sealing member 8 into a wedge profile is chosen to provide a sufficient mass of material for compensating for the irregularities, tolerances, gaps or other interstices (e.g., due to wearing of the mechanical surfaces) between the capsule and the enclosing or bell member. As the watertight sealing may also be obtained dynamically, i.e., by effect of the water under pressure forcing on the sealing member, the shape, dimension and overall mass of the sealing member should be sufficient to deform, thus resiliably "flow" and fill correctly the left openings when the pressure builds up during brewing.

Figure 3:
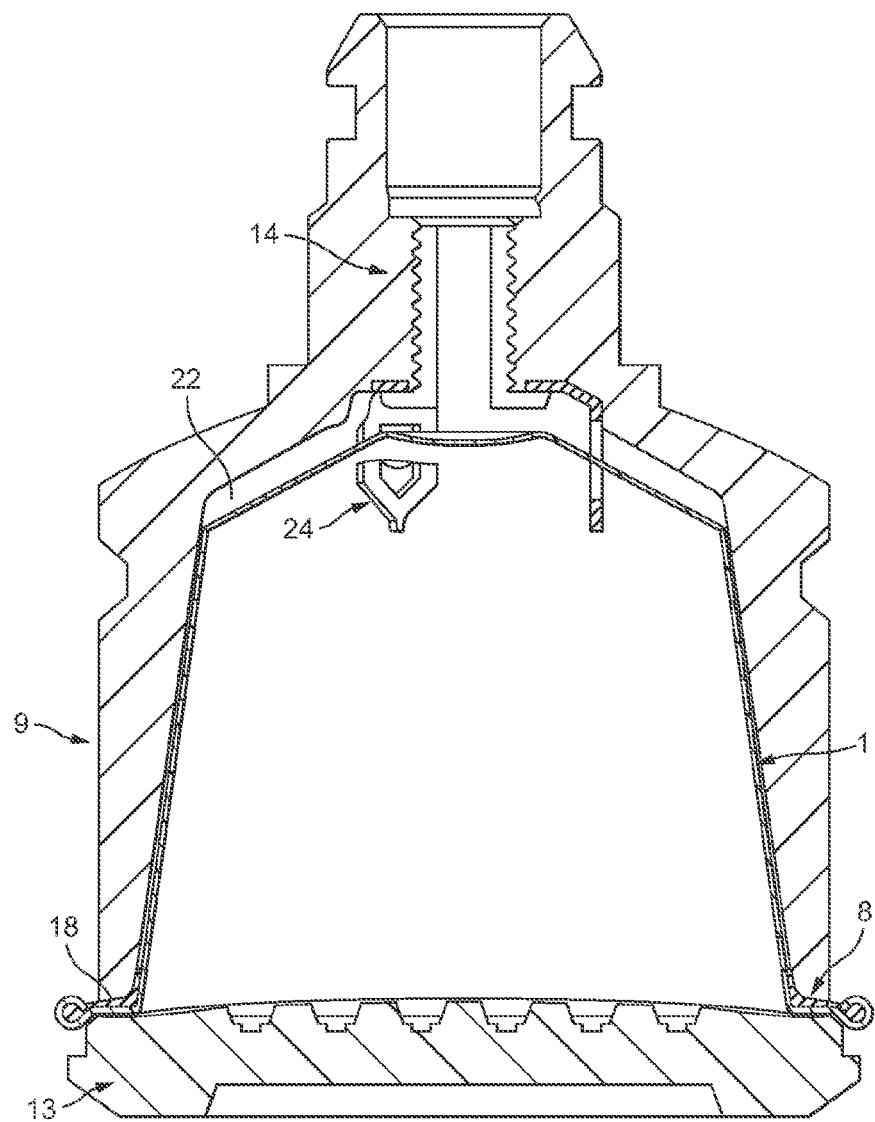

FIG. 3 shows the state in which the enclosing member 9 and the capsule holder 13 are brought in closing pressure engagement at the rim and due to the water entering the interior of the capsule and building up a pressure there the pyramidal relief members 12 of the capsule holder 13 produce openings in the foil member 5 of the capsule 1. Upon insertion of the capsule the blade elements 24 of the water injector 14 have previously created perforations 16 in the top wall 17 of the capsule 1. When a sufficient pressure of fluid has been built inside the capsule, the beverage produced from the ingredients contained in the capsule can be drained in small interstices or perforations created by tearing of the foil member 5 by the relief elements 12.

In a first step of the method (not illustrated), the body 4 of the capsule is produced. The body can be produced with a preform of the flange-like rim 6 which remains open for injection of material of the sealing member in the subsequent injection step. The body 4 can be preformed by deep drawing of a metal sheet or an assembly of multiple plies including metal, e.g., aluminium and plastic, e.g., polypropylene and eventually binders and/or lacquers. Depending on the complexity of the shape of the body and the depth of the cavity, the sheet can be deep drawn in more than a single step. Also, the cavity of the body and the flange-like rim can be formed in a same operation or, alternatively, in separate operations.

Figure 4:
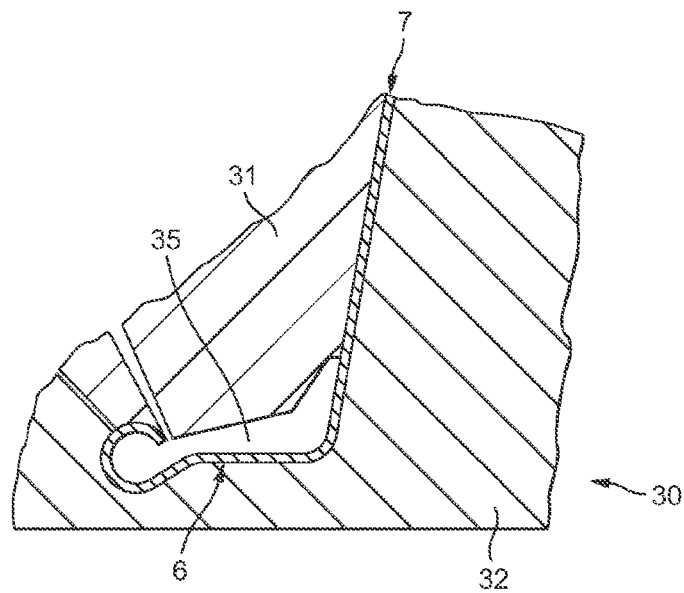
FIGS. 4 and 5 show schematically the injection operation of the sealing member on the capsule body.
Figure 5:
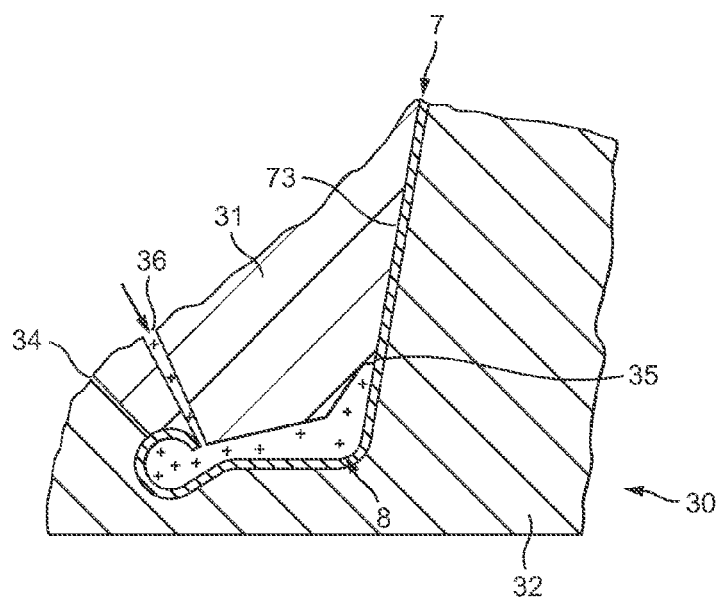
Figure 6:
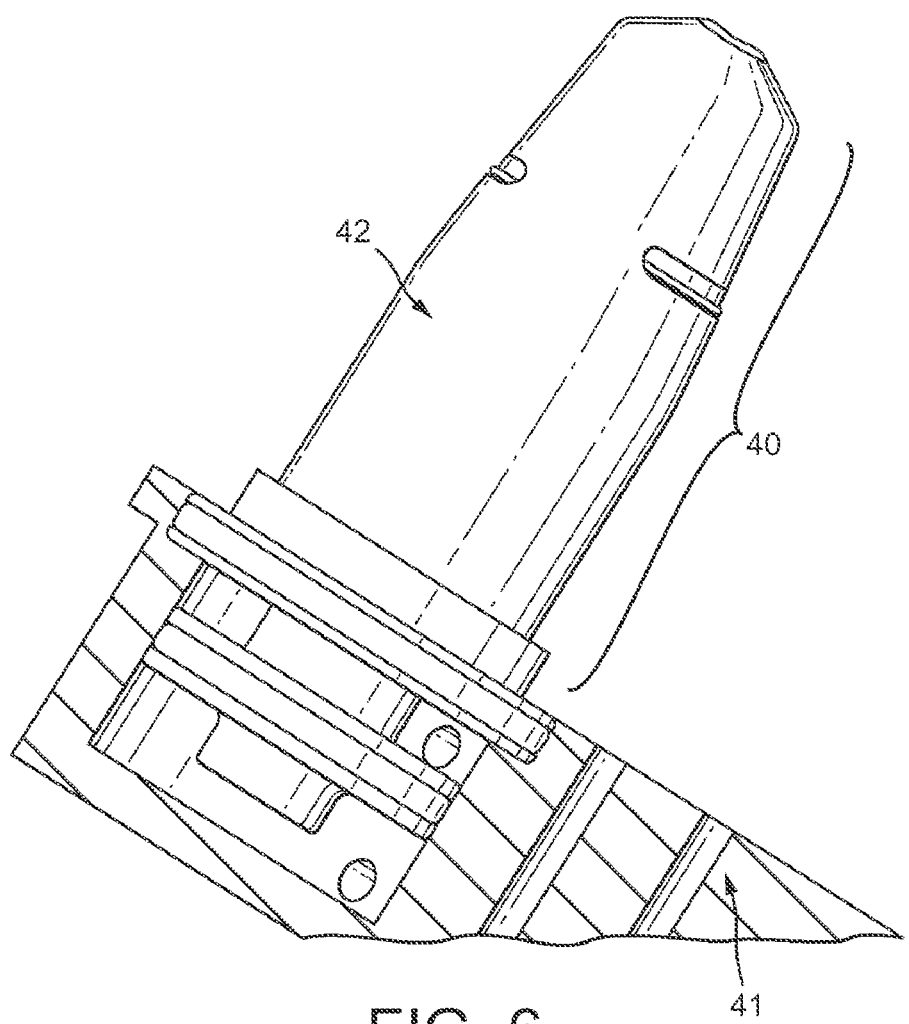
FIGS. 6 to 10 show detail of the male injection die that holds the capsule body and provides a deformation 'in situ' during the injection operation.
Figure 7:
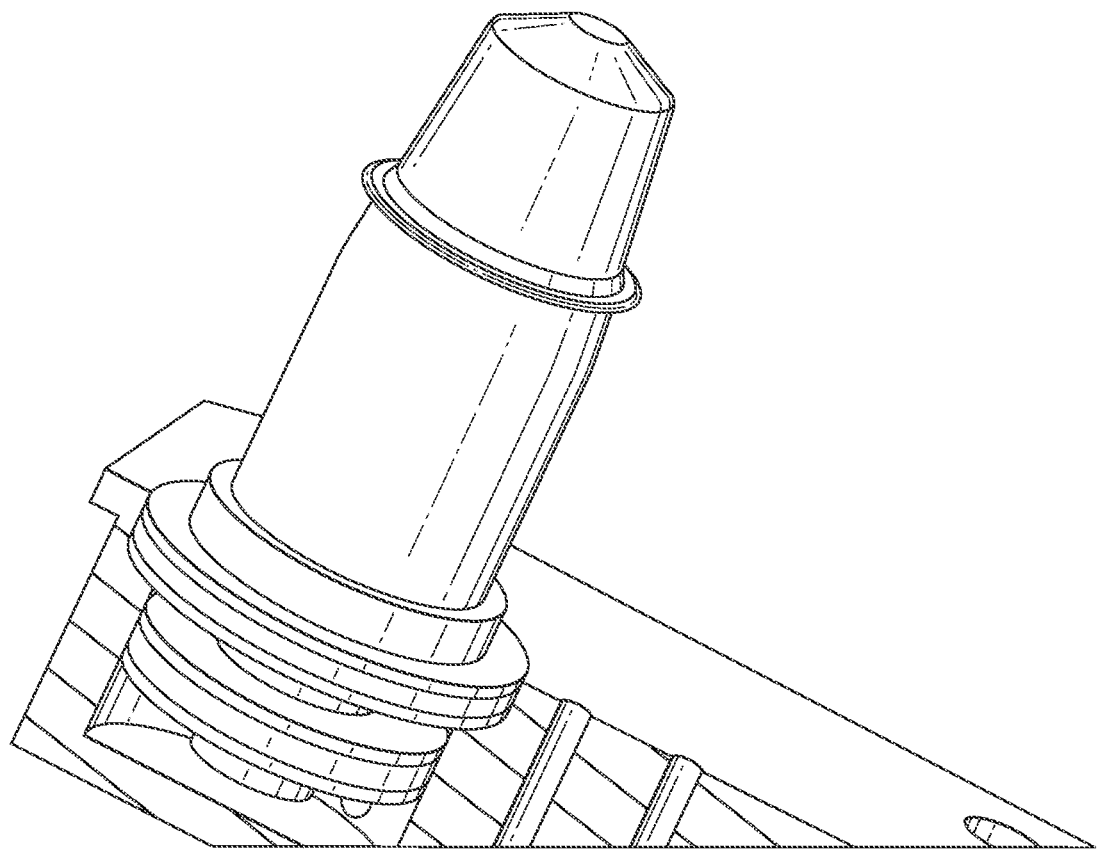

FIGS. 4 and 5 show the injection operation of the sealing member 8 on the preformed body 7. The body can thus be placed between an injection die assembly 30. The die assembly typically comprises two die members, a female die member 31 and a male die member 32 which are assembled tightly about the capsule body and leave an injection room 35 for the sealing material to be injected in to form the sealing member. The female die member 31 surrounds the external sidewall 7 and top wall 17 of the body, and usually also delimits the volume 35 for the sealing member to be injected on the flange-like rim 6 and further extends to a parting line 34 which can be situated, for instance, substantially at the end of the partially curled portion 61 of the rim therefore to enable easy removal of the body from the die after injection. The male die member 32 is inserted inside the cavity of the body and matches the external form of the flange-like rim (e.g., lower surface of the rim) up to the parting line 34.

Advantageously, the die assembly 30 extends along the whole side 7 of the body and imposes a relatively high mechanical pressure on the sidewall 7. The advantages are two fold.

Firstly, the injection is carried out a relatively high pressure-short time therefore a pressure tight injection seal arrangement must be obtained in particular at the junction line 34 between the external sidewall of the body and the uppermost point of the sealing member.

Secondly, the pressure can also be effective to smooth the external surface 73 of the body's sidewall. The former deep drawing operation tends to create wrinkles on the surface of the sidewall due to the general truncated form of the body. Therefore, the mechanical pressure exerted by the male and female dies directly at the whole opposed surfaces of the sidewall 7 enables to flatten the wrinkles and eliminate or at least significantly reduces this visual defect.

The injection takes place through at least one small injection gate 36. The opening of the gate at the entry of the injection room can be in the order of 0.5-1 mm. The injection is carried out at a high pressure, i.e., an average of between 700 to 1500 bar during less than 1.01 second, typically 0.01 second. The plastic is injected in at a temperature above glass transition. Preferred thermoplastic elastomer is a TPE. The sealing member 8 that is obtained is allowed to cool down for at least a few seconds, typically, 5-10 seconds, before the die assembly is reopened and the body is extracted. Cooling can be assisted with a coolant that circulates inside a cooling circuit of the die assembly to diminish the hardening cycle for the sealing member.

Figure 8:
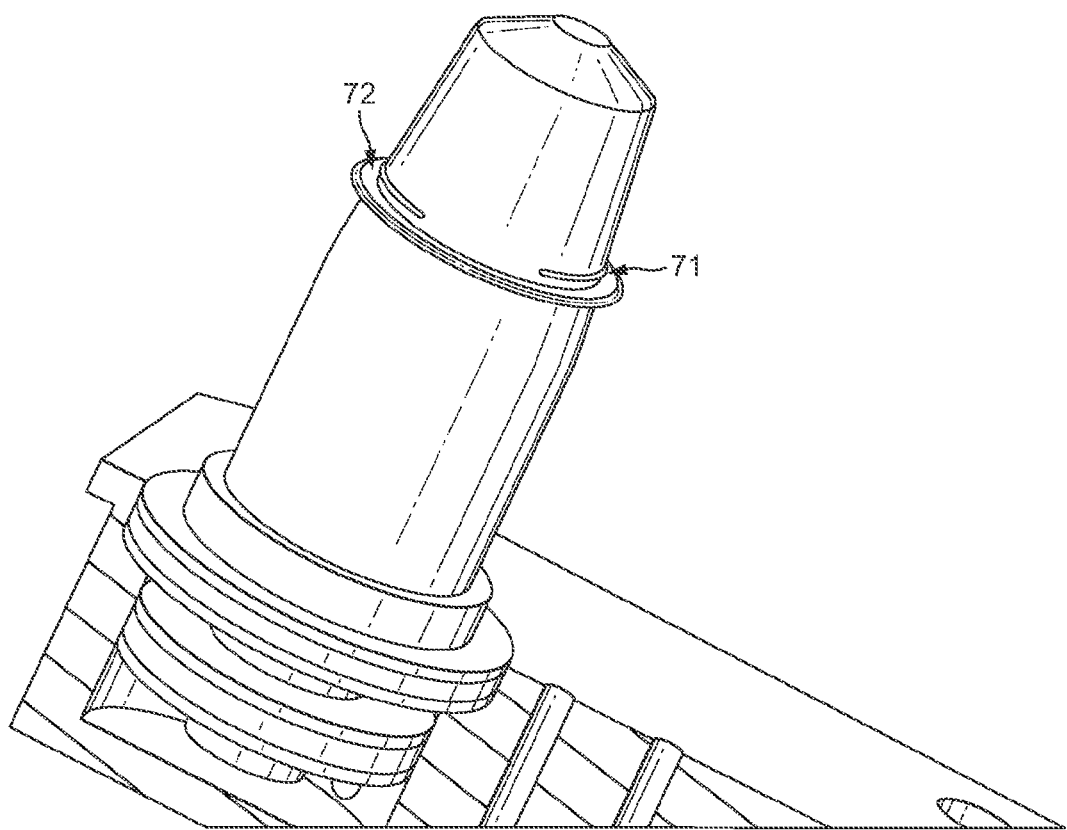
Figure 9:
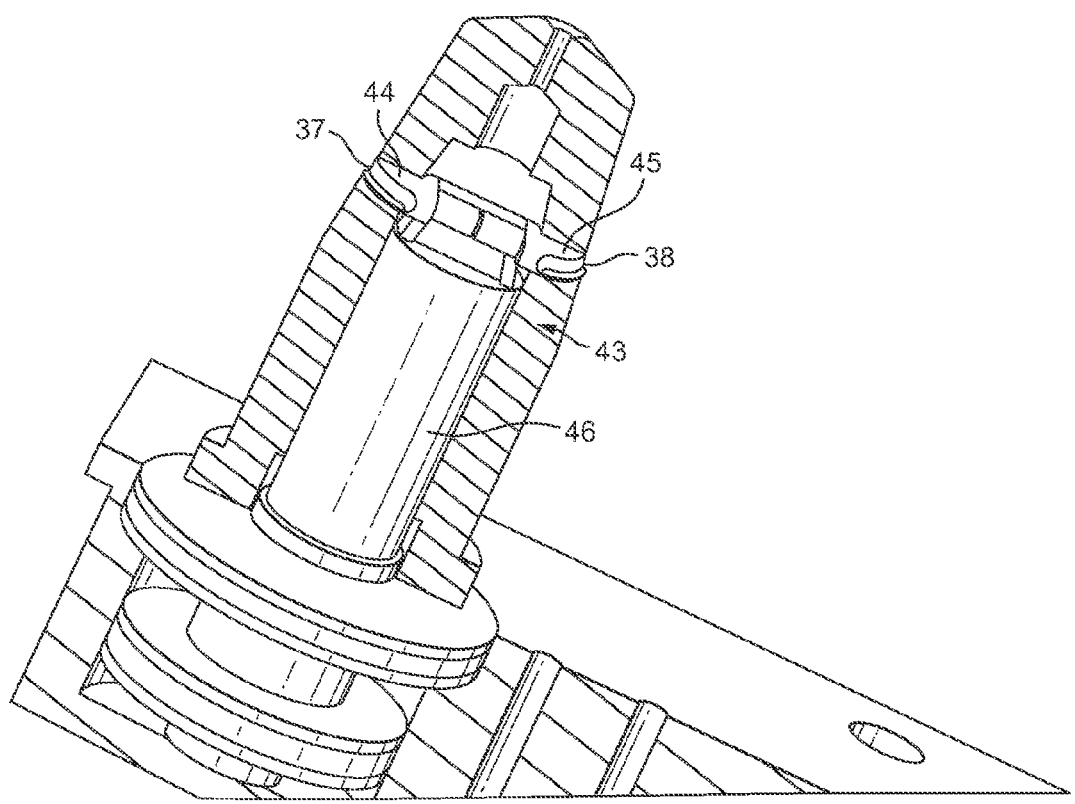
Figure 10:
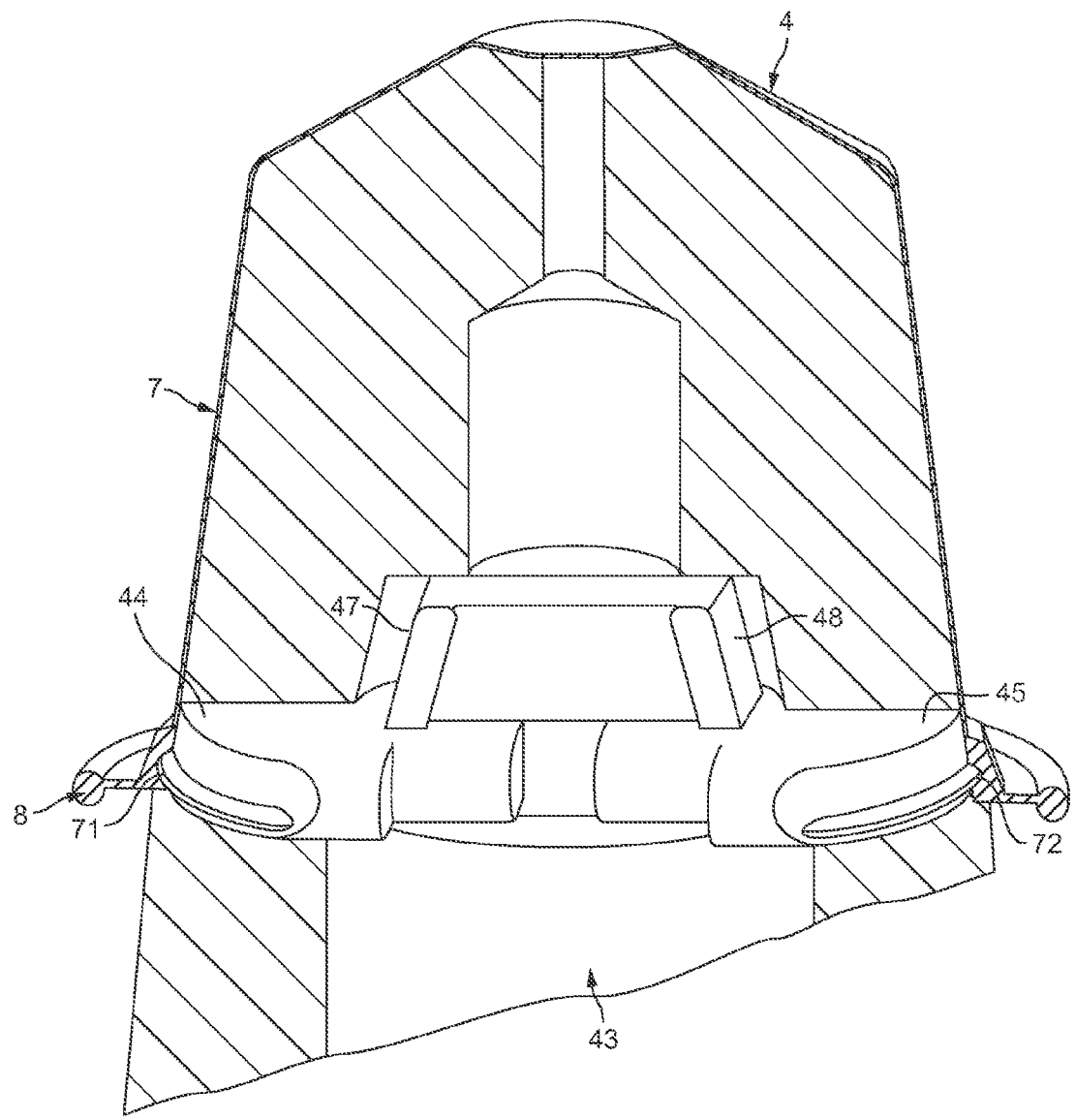

FIGS. 6 to 10 show in detail, the injection male die arrangement 40 according to a possible embodiment. The male die arrangement 40 can be mounted in an impervious manner on a frame 41. It comprises a mandrel 42 with an end which substantially matches the internal cavity of the capsule's body as illustrated in FIG. 8. Inside the mandrel is provided a moveable eccentric punching assembly 43 as illustrated by FIGS. 9 and 10. The eccentric assembly comprises two punching members 44, 45 mounted slidably along radially oriented slots 37, 38 of the mandrel (FIG. 9). The punching members 44, 45 are activated in extension/retraction through the slots by a longitudinal pusher 46 which is moved back and forth along the longitudinal axis of the mandrel. The central pusher has portions of ramp 47, 48 which activate the punching members 44, 45 in opposed radial sliding motions along the slots.

As illustrated in FIG. 10, when the central pusher is pushed upwards, the punching members 44, 45 are moved radially against the sidewall 7 of the body 4 and thus cause the sidewall of the capture body to deform outwardly according to arc-shaped indentations 71, 72 (FIG. 8) that protrude inside the sealing member 8 (FIG. 10). The indentations can be formed at any time after the capsule body is inserted on the mandrel and before the injection material has hardened. Preferably, the indentations are created just after the injection, e.g., 0.5-1 sec. after injection stopped.

The indentations 71, 72 improve the anchoring of the sealing member on the sidewall at a base region which is critical and where the sealing member tends to come unstuck from the body. As a consequence, it also provides to some extent a more water impervious sealing by preventing risk of leakage at the interface between the sealing member and the body.

It must be noted that the indentation(s) may be formed in many ways a man skilled in the art can think of and that the present invention only refers to an industrial possible way for matter of illustration only. Also, the indentations may have different forms such as pins, bumps, etc.

FIGS. 11 to 14 illustrate a possible layout for the injection station for handling injection cycles at a high throughput. The general principle will now be explained.

Figure 11:
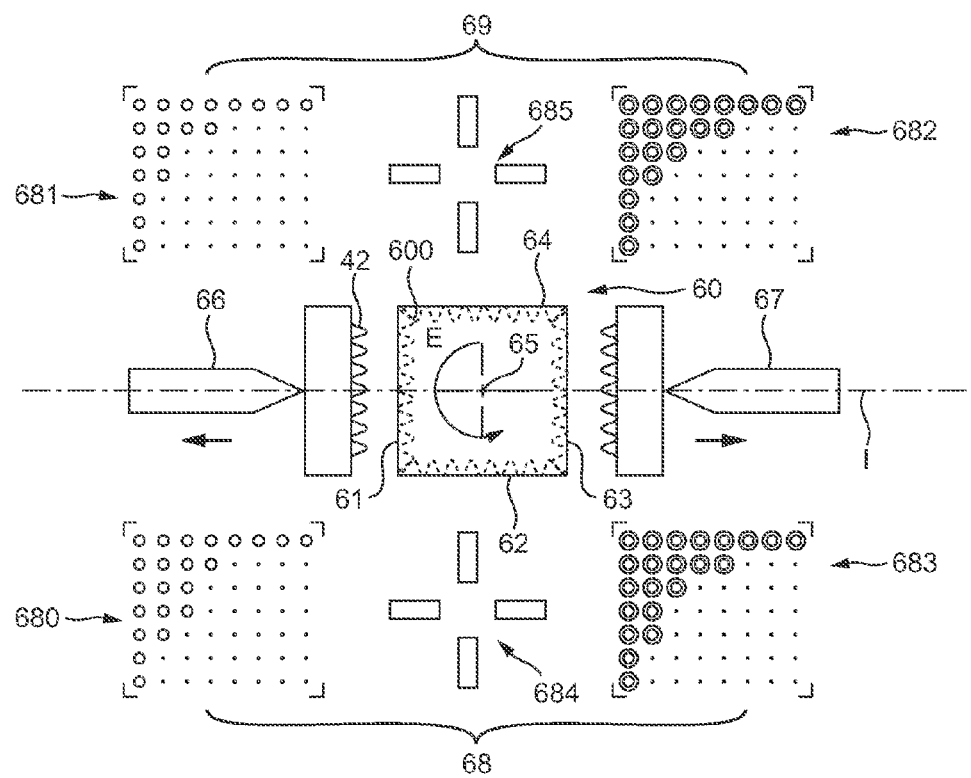
FIGS. 11 to 13 show views of the injection device layout at the manufacturing site enabling high throughput of injected capsule parts.

FIG. 11 represents the general injection lay out which can handle two series of injection assemblies running simultaneously on opposed sides. The principle is based on a cubic injection female die member 60 that comprises four injection die sides 61, 62, 63, 64 and can rotate at 90 degrees along a central axis 65 to move the sides of a 90-degree incremental path. Each female side includes a series of injection die cavities 600 for individual insertion of capsule bodies therein. The cavities are usually distributed on the die side according to a predefined pattern, preferably, along a number of lines and columns, for example, in a square pattern, 7 lines times 7 columns giving thus a total of 49 individual injection sites. The pattern and the number of lines and columns in the pattern can vary depending on the required throughput.

The cubic injection female die 60 is associated to two male dies 66, 67 facing opposite sides 61, 63 of the cubic female die member. The male dies 66, 67 can reciprocate relative to the cubic die 60 to be able to open and close against the cavity sides of the cubic injection die. The male dies 66, 67 further comprise male mandrels 42 in number and according to a distribution matching the number and distribution of the injection sides.

In the direction orthogonal to the "injection direction I" (i.e., the direction at which the die assemblies are closing simultaneously on the cubic die), are positioned facing the two other opposed sides 62, 63 of the cubic die, stock and transport means 68, 69 for automatically loading/unloading the bodies in the cavities 600 of said sides. This stock and transport means can comprise loading areas 680, 681 arranged for comprising "naked" capsule bodies (bodies without injected sealing members) arranged in square patterns and bodies' stock areas 682, 683 arranged for receiving the "sealed" capsule bodies (i.e., bodies with the injected sealing members thereon). In between are arranged multidirectional robots 684, 685 configured in at least three directions to, respectively: a) unload the sealed bodies of a given pattern at once from the full injection sides, b) transport the sealed bodies of a given pattern to the bodies' stock areas 682, 683, c) take the naked bodies of a given pattern at once from the loading area 680, 681 and d) transport and place them in the empty cavities of the injection sides moved for facing the stock and transport means.

The multidirectional robots 684, 685 may comprise individual suction means, for example, vacuum assisted suction means, to take, transport and release the bodies all at once.

Figure 12:
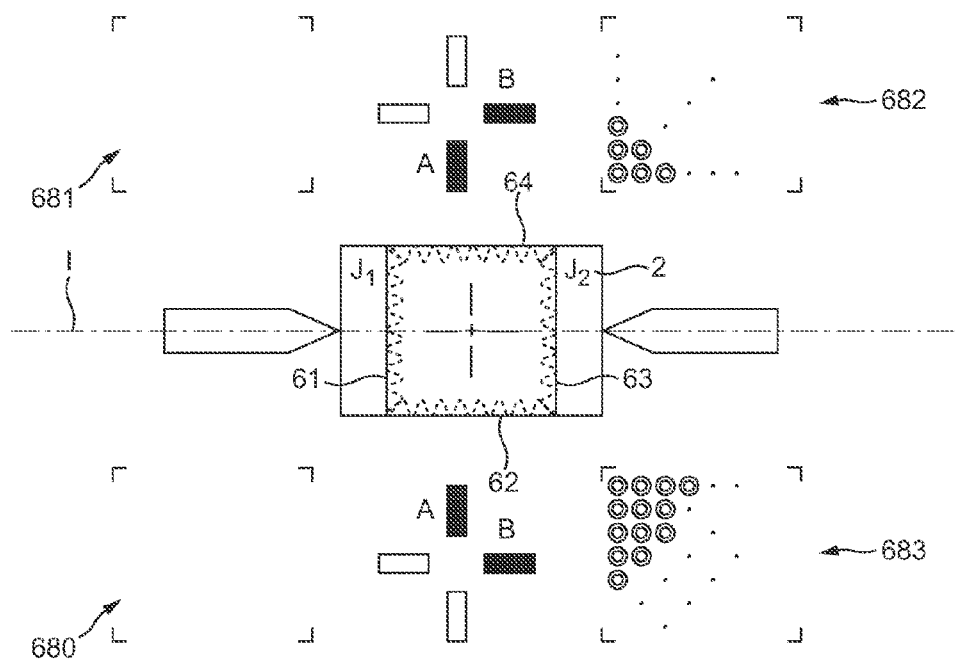

FIG. 12 illustrates, a cycle of injection of two series of patterns J1, J2 being simultaneously injected. The other loading/unloading operations can be run simultaneously during the injection at these sides 61, 63. In step A, the robotic means remove the sealed bodies from the full sides 62, 63. In step B, the robotic means then transport and unload the sealed bodies in the unloading area 682, 683. In step C, the robotic means take a new waiting pattern of naked capsule bodies (e.g., 49 bodies arranged in a 7×7 square pattern) from the bodies' stock areas 680, 681. Then in step D in FIG. 13, the robotic means transport and load the captured series of naked bodies in the empty injection sides 62, 64 of the cubic die member 60. The steps A-D can be implemented while two other series of bodies in the two contiguous sides 61, 63 are injected with the sealing members. Therefore, a much higher throughput can be achieved since almost every about 10 seconds, two series of 49 (so 98 bodies in total) can be injected with sealing members.

Figure 13:
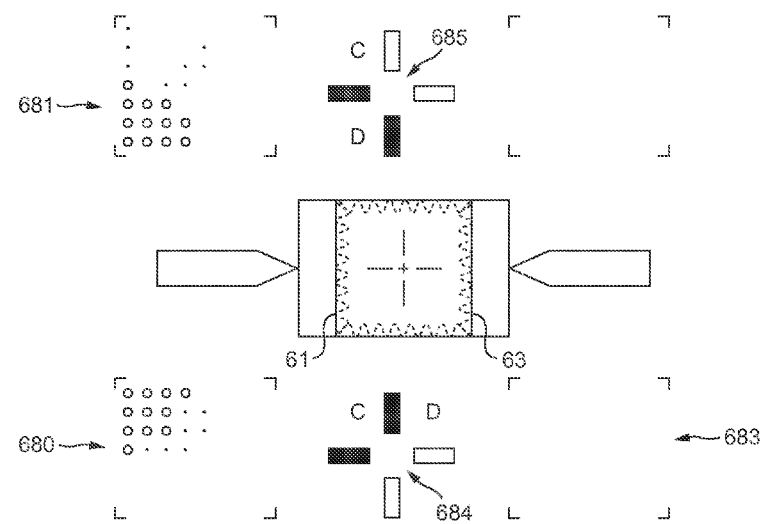

The injection layout of FIGS. 11 to 13 can be simplified to form only one loading/unloading station with only one male injection die.

Figure 14:
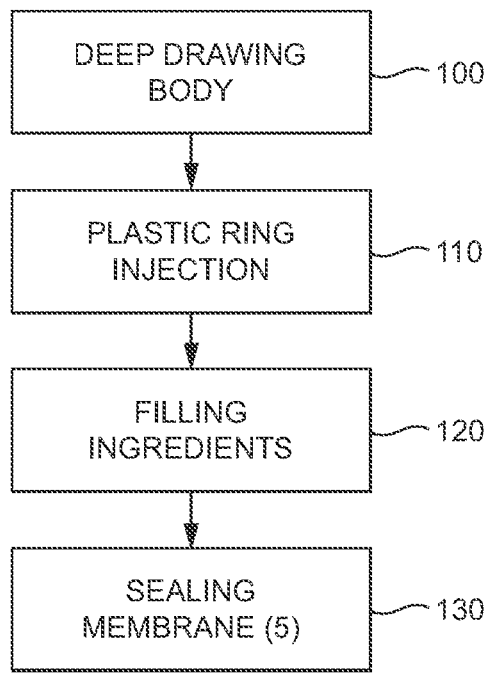
FIG. 14 is a chart illustrating steps according to a mode of the method of the invention.

As illustrated in FIG. 14, the method encompasses one or more steps 100 of deep drawing the capsule's body, injection-moulding 110 of the sealing member (or "ring"). In a next step 120, the body is filled with food ingredients and finally, in step 130, the membrane 5 is welded. e.g., by heat or ultrasonic welding, on the external face of support portion 60 of the flange-like rim. Additional steps can be envisaged at any suitable time during the production process such as positioning and affixing of filters inside the body and/or the membrane 5 before or after deep drawing of the body.

The present invention encompasses other possible variants. For example, the sealing member can be formed of two or more injection materials having different hardness. For instance, an inner layer of a first material can be firstly injected on the body. An outer layer of a second material softer than the material of the inner layer can be then over-moulded on the inner layer. The inner layer can be to improve the bonding for the second material. The outer material can be softer for reducing the closing efforts necessary to close the enclosing members of the beverage production device on the capsule.

Figure 15:
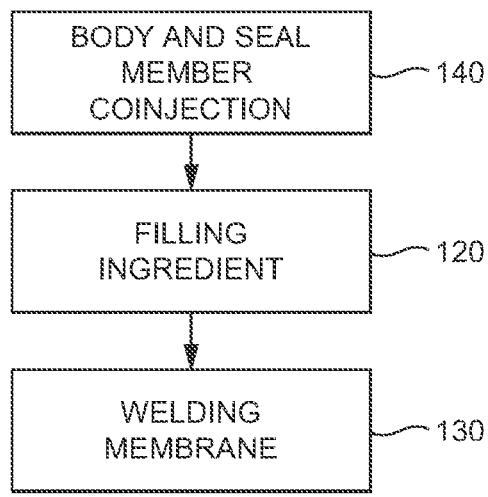
FIG. 15 is a chart illustrating steps according to a variant of the method of the invention.

In another possible variant illustrated in FIG. 15, the capsule body can be formed of plastic material. The body is also preferably injection-moulded. The body and the sealing member can be so co-injected (step 140). The body can be in plastic of higher Young modulus than the sealing member but the two materials should be compatible to adhere to each other. Example of a suitable material for the body and sealing member is a TPE. The body may also be provided with injected multi-layers comprising one or more gas barrier layer such as EVOH (Ethylene-Vinyl-Alcohol-Copolymer) which is embedded between an inner and outer layers made of TPE.

What is claimed is:

1. In a method for providing a capsule containing beverage ingredients designed for insertion in a beverage production device in which a liquid under pressure enters the capsule in order to interact with the ingredients in the capsule and to drain a beverage from the capsule, the improvement which comprises providing a body for the capsule and injecting at least one sealing material by injection-molding onto at least a portion of an external surface of the body to mold a sealing member sealingly attached thereto; wherein the sealing member is geometrically arranged to be in sealing engagement with at least a matching surface of the beverage production device.

2. The method according to claim 1, wherein the injected material for the sealing member is different from the material forming the body of the capsule.

3. The method according to claim 1, wherein the injected material for the sealing member is softer than the material forming the body.

4. The method according to claim 1, wherein the body is formed with a flange-like rim and the injection step comprises injecting the sealing member onto the flange-like rim.

5. The method according to claim 4, wherein the flange-like rim comprises an anchoring portion and a support portion; wherein the injection step comprises injecting the sealing member both in the anchoring portion and the support portion.

6. The method according to claim 5, wherein the anchoring portion is formed of a partially curled portion that serves as an opening for plastic to flow therein during injection.

7. The method according to claim 1, wherein the injection is made in injection dies under a pressure of about 500 to 2000 bar and during less than or about a second, and wherein, after injection, the body with its injected sealing member is allowed to cool down during a few seconds in the injection dies.

8. The method according to claim 1, wherein the injected material is a thermoplastic elastomer and the capsule body comprises aluminum.

9. The method according to claim 1, which further comprises pre-forming the capsule body by deep drawing of a metal or metal-plastic sheet.

10. The method according to claim 9, which further comprises providing at least one localized deformation in a sidewall of the capsule body to create anchoring means for the sealing member, wherein the at least one localized deformation is provided by the deep drawing operation.

11. The method according to claim 1, which further comprises providing at least one localized deformation in a sidewall of the capsule body to create anchoring means for the sealing member, wherein the at least one localized deformation is provided during injection or cooling down of the injection-molded sealing member.

12. The method according to claim 1, wherein the capsule body is made of an injection molded material and which further comprises co-injection molding of the capsule body and the sealing member to produce a unitary structure.

13. The method according to claim 1, which further comprises filling the body with food ingredients and imperviously closing the body by welding a membrane to the body to hermetically close it.

14. A capsule for containing beverage ingredients, the capsule being designed for insertion in a beverage production device in which a liquid under pressure enters the capsule in order to interact with the ingredients in the capsule and to drain a beverage from the capsule, with the capsule including a sealing member on an outer surface of the capsule body member, wherein the sealing member is geometrically arranged to be in sealing engagement with at least a matching pressing surface of a beverage production device, wherein the capsule comprises a body for holding the beverage ingredients with the body having a flange-like rim with the sealing member attached thereto; and further wherein the sealing member is made of injection-molded material and is affixed to the external surface of the flange-like rim.

15. The capsule according to claim 14, wherein the sealing member is made of a material that is softer than the material of the body.

16. In a method for providing a capsule containing beverage ingredients designed for insertion in a beverage production device in which a liquid under pressure enters the capsule in order to interact with the ingredients in the capsule and to drain a beverage from the capsule, the improvement which comprises providing for the capsule a body that includes a flange extending from a sidewall, and injecting at least one sealing material by injection-molding onto at least a portion of the flange that is adjacent an external surface of the body to mold a sealing member sealingly attached thereto, such that the sealing member of the capsule is geometrically arranged to be in sealing engagement with a pressing surface of the beverage production device to provide liquid-tightness during brewing of the beverage ingredients.

17. The method according to claim 16, wherein the flange-like rim comprises an anchoring portion and the injection step includes further injecting the sealing member into the anchoring portion.

18. The method according to claim 16, wherein the injection step includes further injecting the sealing member onto a portion of the sidewall of the capsule.

19. A capsule for containing beverage ingredients, the capsule being designed for insertion in a beverage production device in which a liquid under pressure enters the capsule in order to interact with the ingredients in the capsule and to drain a beverage from the capsule, with the capsule having a body that includes a flange extending from a sidewall and that has a sealing member provided on at least a portion of the flange that is adjacent an external surface of the body, wherein the capsule body holds the beverage ingredients therein, and the sealing member is made of injection-molded material and is geometrically arranged to be in sealing engagement with a pressing surface of a beverage production device to provide liquid-tightness during brewing of the beverage ingredients.

20. The capsule according to claim 19, wherein the flange-like rim comprises an anchoring portion and the sealing member extends into the anchoring portion.

21. The capsule according to claim 19, wherein the sealing member extends onto a portion of the sidewall of the capsule.

* * * * *